United States Patent
Liao et al.

(10) Patent No.: US 6,840,148 B2
(45) Date of Patent: Jan. 11, 2005

(54) SCROLL SAWING MACHINE WITH A SPEED RATIO VARYING DEVICE

(75) Inventors: Juei-Seng Liao, No. 295, Sec. 1, Nanking E. Rd., Taichung City (TW); Pei-Lieh Chiang, No. 12, Nan-Ping Rd. Nan Dist., Taichung City (TW)

(73) Assignees: Juei-Seng Liao, Taichung (TW); Pei-Lieh Chiang, Taichung (TW)

( * ) Notice: Subject to any disclaimer, the term of this patent is extended or adjusted under 35 U.S.C. 154(b) by 146 days.

(21) Appl. No.: 10/217,876

(22) Filed: Aug. 13, 2002

(65) Prior Publication Data

US 2003/0230183 A1 Dec. 18, 2003

(30) Foreign Application Priority Data

Jun. 18, 2002 (TW) ........................................ 91209100 U

(51) Int. Cl.[7] .............................. B27B 3/00; F16H 55/56

(52) U.S. Cl. ........................... 83/781; 83/783; 408/128; 474/8; 474/69

(58) Field of Search .......................... 474/8–46, 69–89; 83/781, 783; 408/128

(56) References Cited

U.S. PATENT DOCUMENTS

| | | | | |
|---|---|---|---|---|
| 2,287,450 A | * | 6/1942 | Price | 474/89 |
| 3,718,405 A | * | 2/1973 | Keiter et al. | 408/128 |
| 3,811,331 A | * | 5/1974 | Moogk | 474/19 |
| 4,503,742 A | * | 3/1985 | Sutton | 83/781 |
| 5,061,124 A | * | 10/1991 | Chen | 408/135 |
| 5,567,094 A | * | 10/1996 | Chung | 409/183 |
| 6,398,678 B1 | * | 6/2002 | Chin-Feng | 474/29 |

* cited by examiner

Primary Examiner—Kenneth E. Peterson
(74) Attorney, Agent, or Firm—Webb Ziesenheim Logsdon Orkin & Hanson, P.C.

(57) ABSTRACT

A scroll sawing machine includes a first transmitting shaft driven by an output shaft of a motor, a second transmitting shaft rotatable to move a blade-driving member in an upright direction so as to enable a saw blade to perform reciprocating movement, and a speed ratio varying device disposed to couple the transmitting shafts. The device includes two pitch-variable first and second pulleys mounted on the transmitting shafts, a belt trained on the pulleys, and a control unit operable to move a movable disc of the first pulley toward or away from a fixed disc of the first pulley so as to vary the radial distances between the belt and each of the transmitting shafts, thereby varying the speed ratio of the second transmitting shaft to the first transmitting shaft.

2 Claims, 16 Drawing Sheets

US 6,840,148 B2

SCROLL SAWING MACHINE WITH A SPEED RATIO VARYING DEVICE

CROSS-REFERENCE TO RELATED APPLICATION

This application claims priority of Taiwanese Application No. 091209100, filed on Jun. 18, 2002.

BACKGROUND OF THE INVENTION

1. Field of the Invention

This invention relates to a scroll sawing machine, more particularly to a scroll sawing machine with a speed ratio varying device for a transmitting shaft which is driven to rotate by an output shaft of a motor so as to effectuate reciprocating upward and downward movements of a saw blade.

2. Description of the Related Art

Referring to FIGS. 1 to 3, a conventional scroll sawing machine 10 is shown to include a machine frame 11, a table 17, a hollow blade-holding frame 12, a saw blade 163, a motor 13, a blade-driving member 14, and a table-adjusting member 18.

The blade-driving member 14 includes upper and lower arms 141, 142 which respectively extend along upper and lower frame portions 122, 123 of the blade-holding frame 12 and which have distal ends projecting outwardly for coupling with the saw blade 163 by means of upper and lower mounting seats 161, 162, and a linking lever 143 which is disposed in a connecting frame portion 121 of the blade-holding frame 12 and which is pivoted to the upper and lower arms 141, 142.

The motor 13 is mounted on a motor seat 132 which is disposed in the connecting frame portion 121 of the blade-holding frame 12, and has an output shaft 131 on which a pulley 151 of a transmitting unit 15 is sleeved. The transmitting unit 15 has a cam wheel 152 mounted rotatably on the motor seat 132, and a belt 153 trained on the pulley 151 and the cam wheel 152 such that rotation of the pulley 151 is transmitted to rotate the cam wheel 152 to permit a cam portion 154, which is eccentrically mounted on the cam wheel 152 and which engages a slot 1551 in a cam follower 155 of the linking lever 143, to guide the cam follower 155 so as to perform reciprocating upward and downward movements of the upper and lower arms 141, 142.

However, the rotational speed of the cam wheel 152 is fixed, thereby resulting in unchangeable sawing speed of the saw blade 163 for sawing workpieces of different thickness. Thus, the service life of the saw blade 163 may be shortened, and the sawing quality of the workpiece may be adversely affected.

SUMMARY OF THE INVENTION

The object of the present invention is to provide a scroll sawing machine with a speed ratio varying device and which permits a transmitting shaft to rotate at a desired speed for driving a saw blade.

According to this invention, the scroll sawing machine includes a machine frame, and a table disposed on the machine frame for placement of a workpiece to be sawn thereon. A motor is disposed under the table, and has an output shaft for delivering a driving force. A saw blade extends through the table, and has upper and lower ends opposite to each other in an upright direction. A blade-driving member includes upper and lower driving portions which respectively have distal ends that are coupled respectively with the upper and lower ends of the saw blade, and proximate ends that are disposed respectively opposite to the distal ends, and a linking lever which has upper and lower connecting ends that are connected pivotally and respectively to the proximate ends, such that movement of the linking lever in the upright direction results in running movement of the saw blade in the upright direction. A first transmitting shaft is disposed under the table adjacent to the output shaft, and is driven by the driving force of the output shaft to be rotatable about a first axis. A second transmitting shaft is disposed under the table, and is rotatable about a second axis parallel to the first axis. A cam member is coupled to the second transmitting shaft and the linking lever such that rotation of the second transmitting shaft is transmitted to the linking lever to effectuate the movement of the linking lever in the upright direction so as to initiate the movement of the saw blade in the upright direction.

A speed ratio varying device includes first and second pulleys, a control unit, a biasing member, and a belt. The first pulley has a first fixed disc mounted securely on the first transmitting shaft, and a first movable disc splined to the first transmitting shaft so as to be movable relative to the first fixed disc along the first axis. The first fixed and movable discs respectively have first belt-engaging surfaces which cooperatively define therebetween a first belt receiving space. The second pulley has a second fixed disc mounted securely on the second transmitting shaft, and a second movable disc splined to the second transmitting shaft so as to be movable relative to the second fixed disc along the second axis. The second fixed and movable discs respectively have second belt-engaging surfaces which cooperatively define therebetween a second belt receiving space. A control unit is mounted on the machine frame, and has an operable member which is disposed to actuate the second movable disc to move along the second axis so as to be close to or remote from the second fixed disc. The biasing member is disposed to bias the first movable disc toward the first fixed disc. A belt is trained on the first and second pulleys, and is frictionally slidable on the first and second belt-engaging surfaces. The belt has a first lengthwise end which cooperates with the first transmitting shaft to define a first radial distance therebetween, and a second lengthwise end which is opposite to the first lengthwise end and which cooperates with the second transmitting shaft to define a second radial distance therebetween. As such, when actuated by the operable member, the second movable disc is movable along the second axis between first and second positions. In the first position, the second movable disc is close to the second fixed disc so that the second lengthwise end is remote from the second transmitting shaft so as to result in a greater length of the second radial distance, and the first movable disc is kept apart from the first fixed disc by a tension force which is generated as a result of displacement of the first lengthwise end toward the first transmitting shaft and which acts against biasing action of the biasing member, thereby resulting in a smaller speed ratio of the second transmitting shaft to the first transmitting shaft. In the second position, the second movable disc is remote from the second fixed disc so that the second lengthwise end is near to the second transmitting shaft so as to result in a smaller length of the second radial distance, and the first movable disc is held close to the first fixed disc by the biasing action of the biasing member, thereby resulting in a greater speed ratio of the second transmitting shaft to the first transmitting shaft.

BRIEF DESCRIPTION OF THE DRAWINGS

Other features and advantages of the present invention will become apparent in the following detailed description of the preferred embodiment of the invention, with reference to the accompanying drawings, in which.

DETAILED DESCRIPTION OF THE PREFERRED EMBODIMENTS

Figure 1:
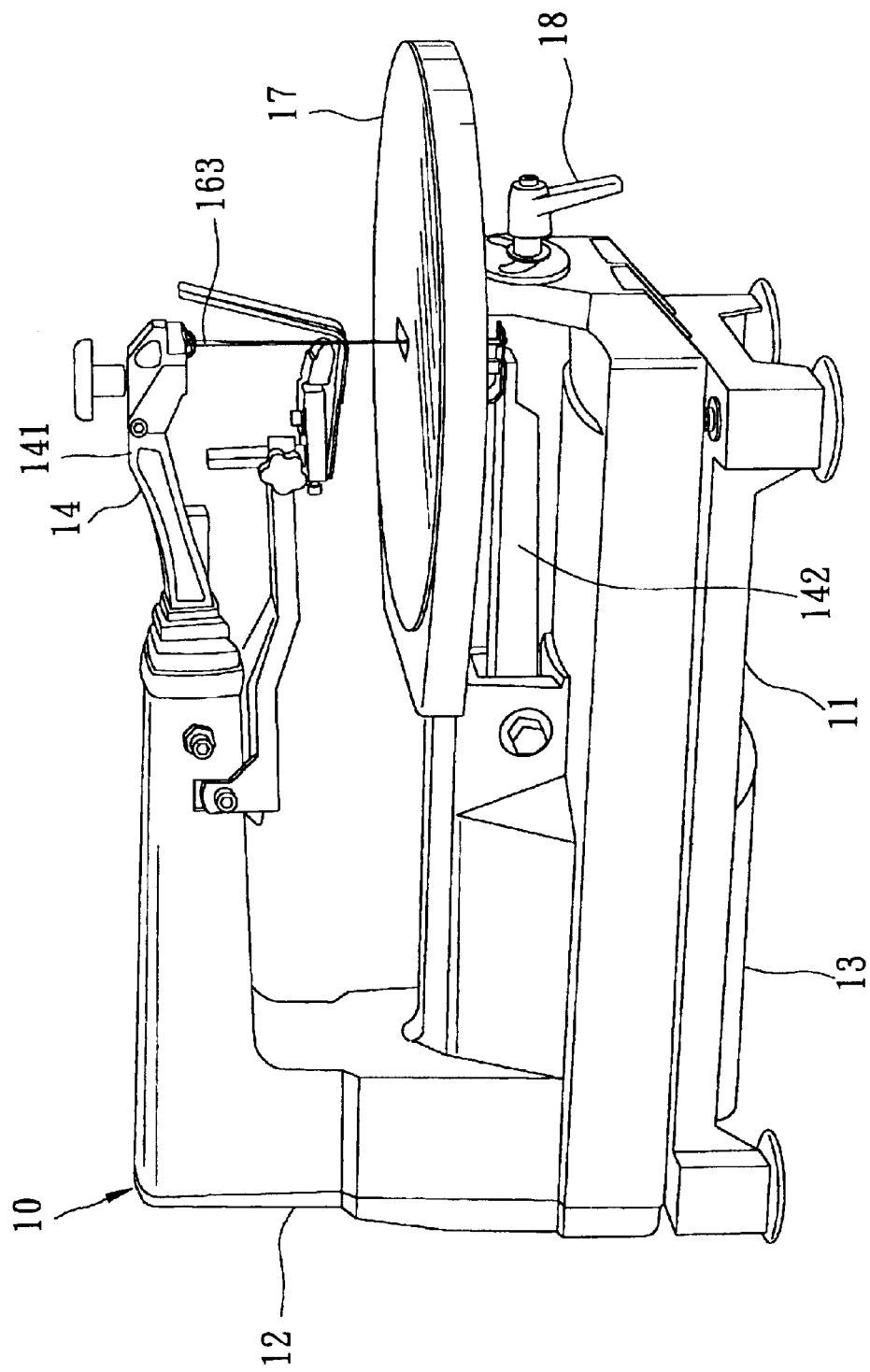
FIG. 1 is a perspective view of a conventional scroll sawing machine.
Figure 2:
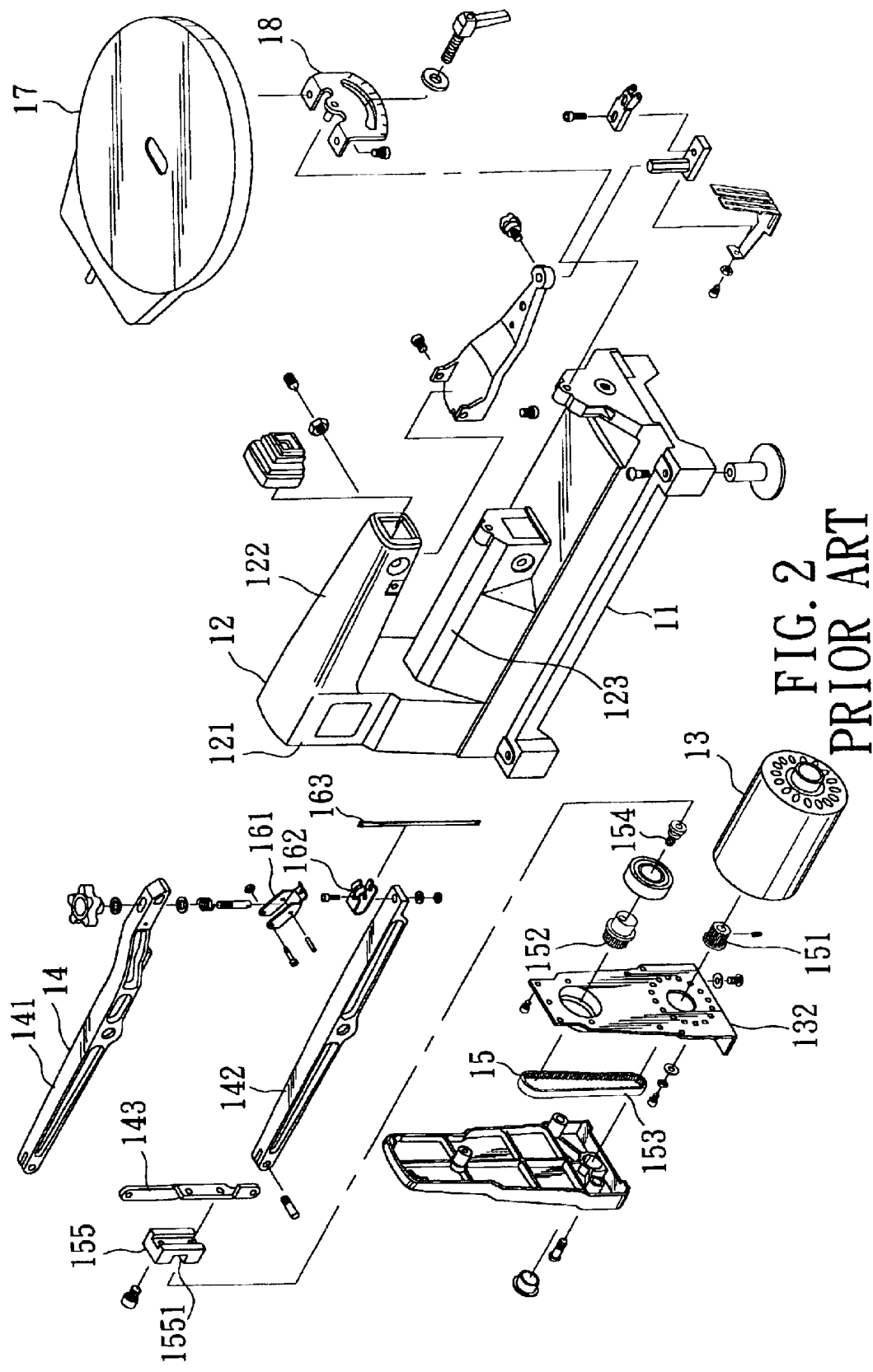
FIG. 2 is an exploded perspective view of the conventional scroll sawing machine.
Figure 3:
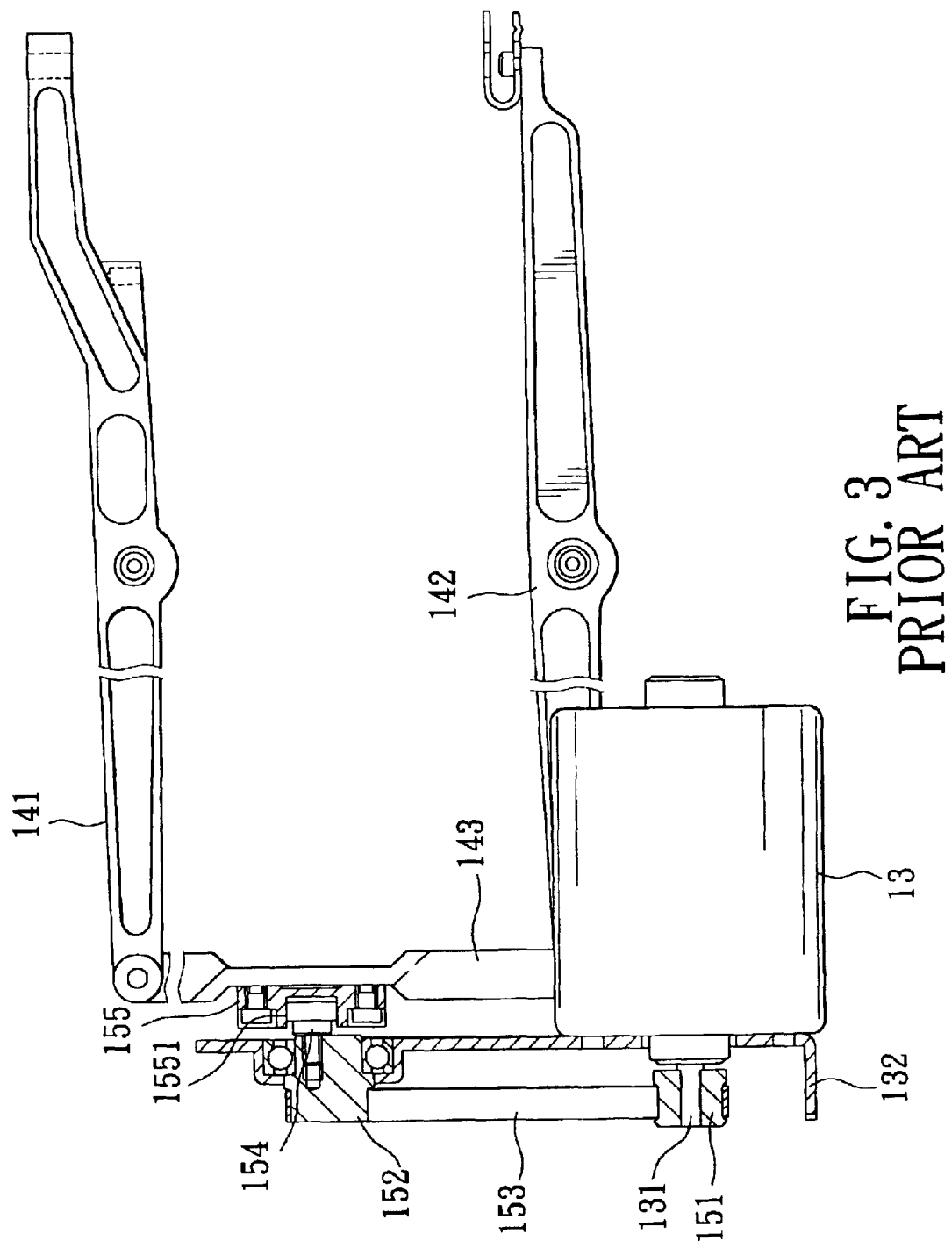
FIG. 3 is a sectional view of the conventional scroll sawing machine.

Before the present invention is described in greater detail, it should be noted that same reference numerals have been used to denote like elements throughout the specification.

Figure 4:
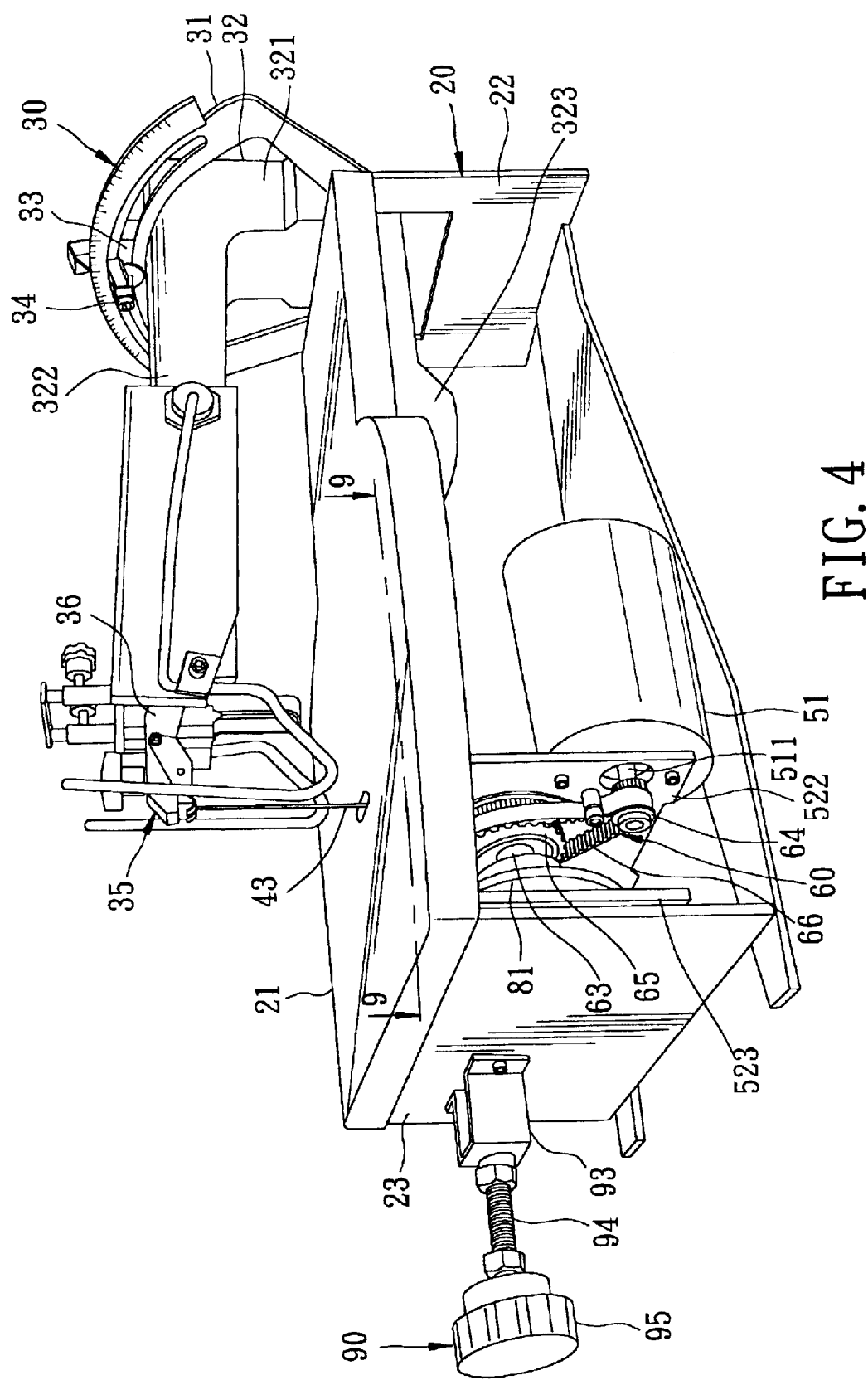
FIG. 4 is a perspective view of a preferred embodiment of a scroll sawing machine according to this invention.
Figure 5:
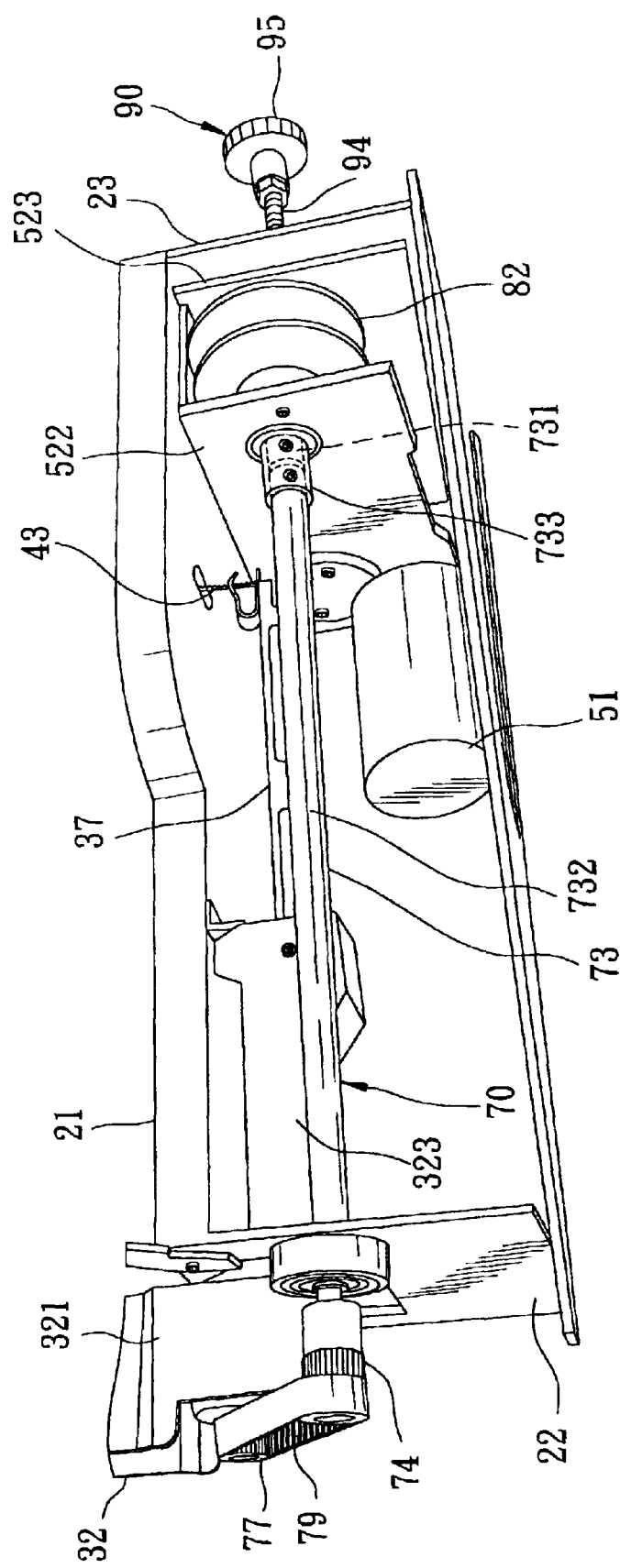
FIG. 5 is a bottom view of the preferred embodiment taken from a rear side.

Referring to FIGS. 4 and 5, the preferred embodiment of a scroll sawing machine according to the present invention is shown to comprise a machine frame 20 which includes two side walls 22, 23. A table 21 is disposed on the side walls 22, 23 for placement of a workpiece (not shown) to be sawn thereon.

Figure 7:
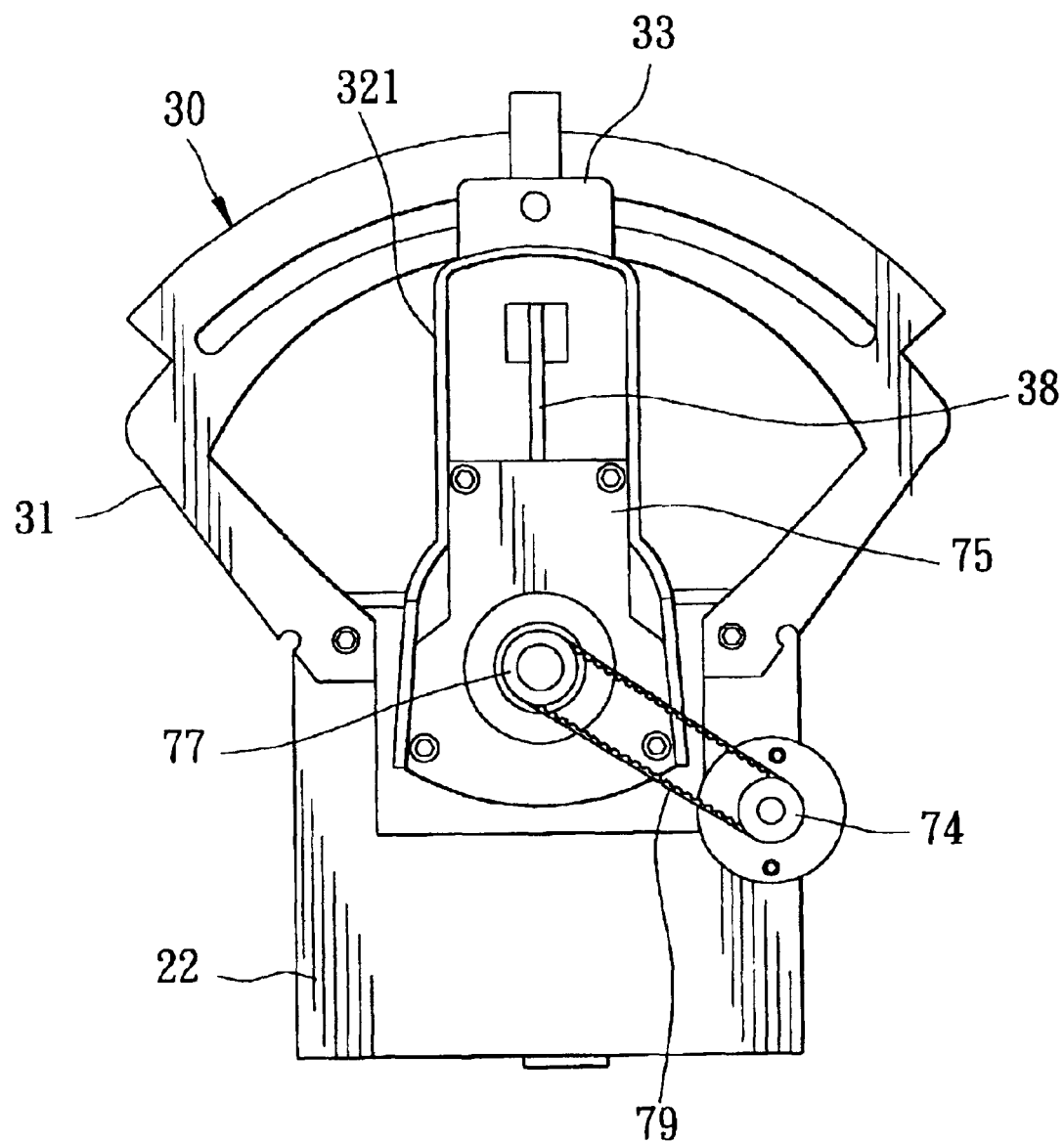
FIG. 7 is a lateral side view of the preferred embodiment.

With reference to FIG. 7, a cantilever frame unit 30 includes a hollow C-shaped frame 32 which includes upper and lower frame portions 322, 323 and a connecting frame portion 321 interposed therebetween, an inverted U-shaped retaining plate 31 secured on the side wall 22, an anchoring block 33 secured on the connecting frame portion 321, and a threaded fastener 34 which engages threadedly in the anchoring block 33 such that tightening of the threaded fastener 34 can fasten the anchoring block 33 to thereby position the C-shaped frame 32 on the machine frame 20.

A motor 51 is secured to an upright support plate 522 under the table 21, and has an output shaft 511 for delivering a driving force.

A saw blade 43 extends through the table 21, and has upper and lower ends opposite to each other in an upright direction.

Figure 8:
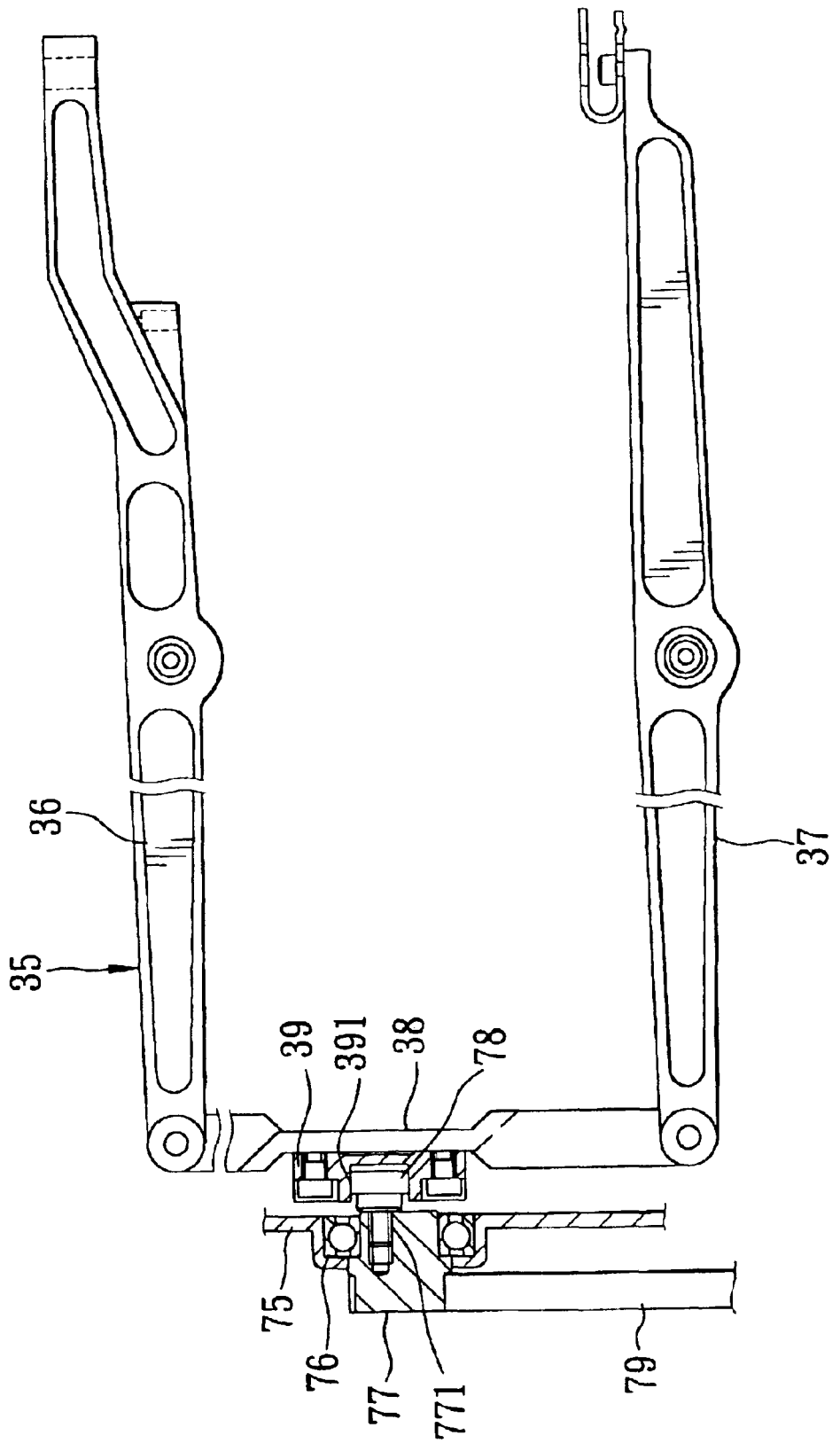
FIG. 8 is a fragmentary schematic view showing a blade-driving member of the preferred embodiment.

A blade-driving member 35 is conventional in construction, and includes upper and lower driving portions 36, 37 which are disposed respectively in the upper and lower frame portions 322, 323 and which respectively have distal ends that are coupled respectively with the upper and lower ends of the saw blade 43 in a known manner, and proximate ends that are disposed respectively opposite to the distal ends. With reference to FIG. 8, a linking lever 38 have upper and lower connecting ends which are connected pivotally to the proximate ends of the upper and lower driving portions 36, 37, respectively. As such, upward and lower movements of the linking lever 38 in the upright direction result in downward and upward running movements of the upper and lower driving portions 36, 37 as well as the saw blade 43 in the upright direction. A coupling block 39 is secured on the linking lever 38, and is formed with a retaining groove 391.

Figure 9:
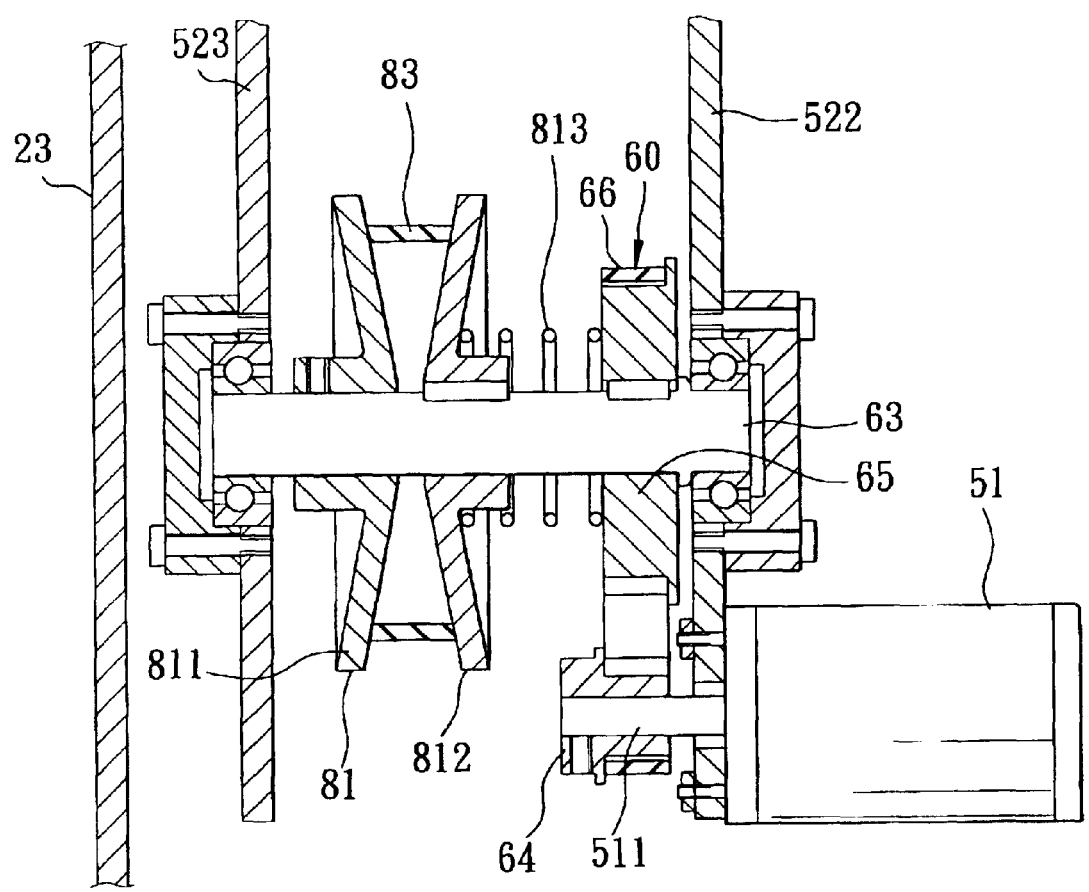
FIG. 9 is a partly sectional view of the preferred embodiment shown in FIG. 4, taken along lines 9-9 thereof.

As shown in FIGS. 4 and 9, a first transmitting unit 60 includes a first transmitting shaft 63 which is disposed rotatably between the upright support plates 522, 523, a first drive wheel 64 which is mounted on the output shaft 511 of the motor 51, a first driven wheel 65 which is mounted on the first transmitting shaft 63, and a first belt 66 which is trained on the first drive and driven wheels 64, 65 so as to transmit the driving force of the output shaft 511 to rotate the first transmitting shaft 63 about a first axis.

Figure 6:
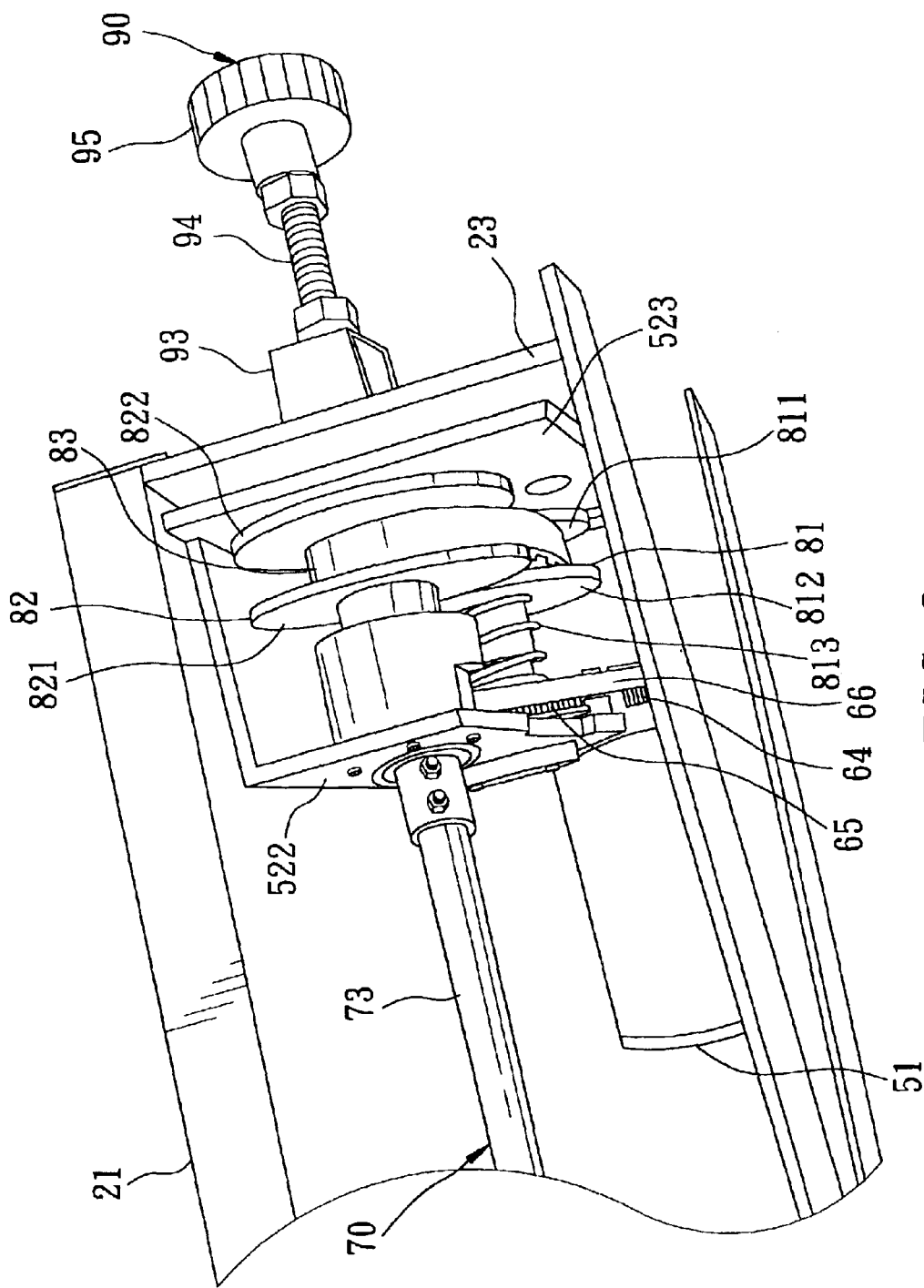
FIG. 6 is a fragmentary bottom view of the preferred embodiment.
Figure 10:
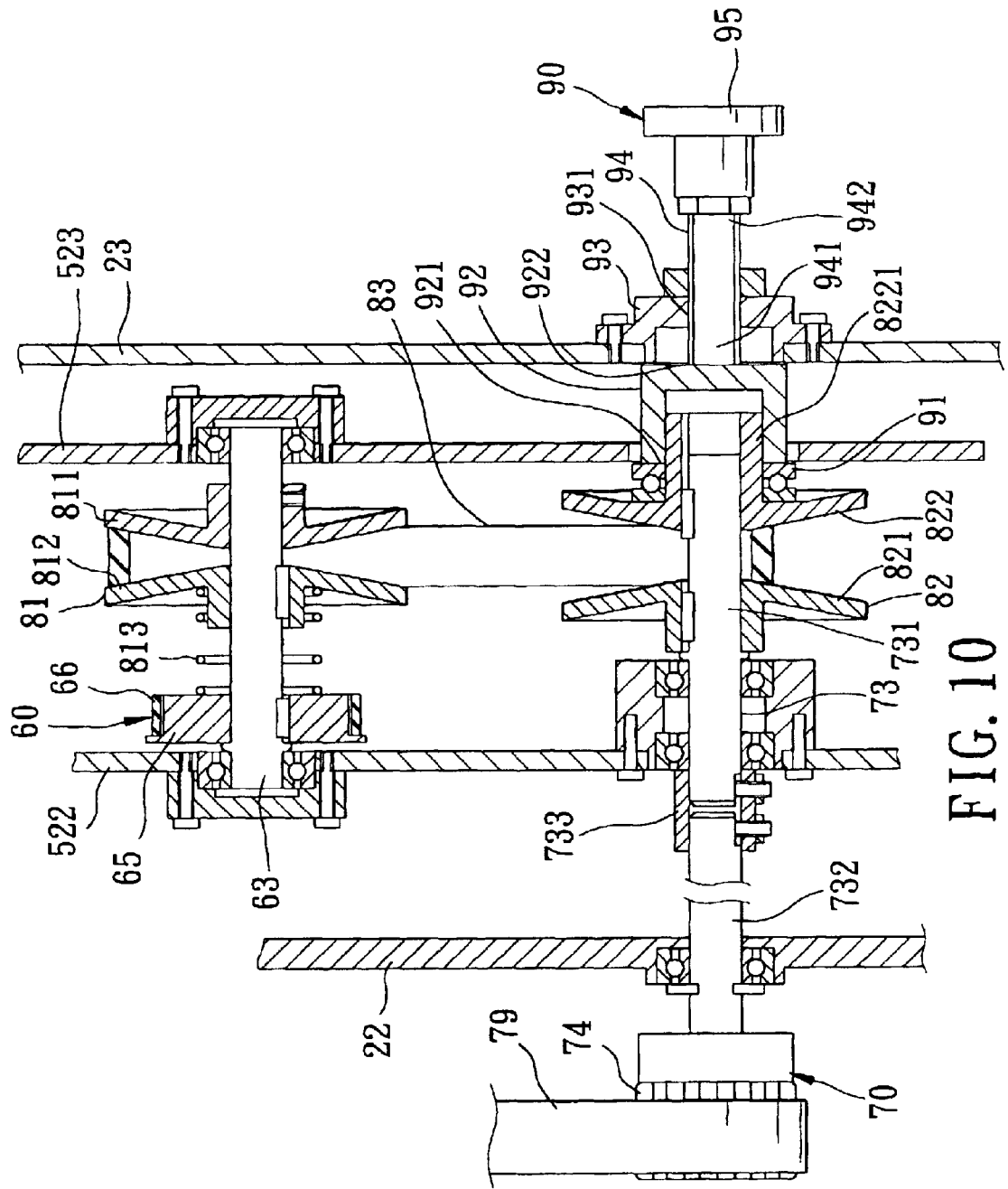
FIG. 10 is a partly sectional view of the preferred embodiment in a state where a control unit is not operated.

As shown in FIGS. 5, 6 and 10, a second transmitting unit 70 is disposed between the upright support plate 522 and the side wall 22, and includes a second transmitting shaft 73 which extends along a second axis parallel to the first axis. The second transmitting shaft 73 includes a drive shaft 731 which is rotatably mounted on the upright support plate 522, a driven shaft 732 which is rotatably mounted on the side wall 22, and a connecting sleeve 733 which interconnects the drive and driven shafts 731, 732. With reference to FIGS. 5, 7 and 8, a second drive wheel 74 is mounted on the driven shaft 732 and disposed outwardly of the side wall 22. A mounting plate 75 is secured in the connecting frame portion 321 and is provided with a bearing 76 therein. A second driven wheel 77 is mounted rotatably on the mounting plate 75 by means of the bearing 76. A second belt 79 is trained on the second drive and driven wheels 74, 77.

Referring to FIG. 8, a cam member includes a threaded bolt 78 which is engaged threadably in a screw hole 771 that is eccentrically formed in the second driven wheel 77. The threaded bolt 78 is further disposed slidably in the retaining groove 391 in the coupling block 39 such that rotation of the second transmitting shaft 73 about the second axis will effectuate the reciprocating upward and downward movements of the linking lever 38 in the upright direction so as to initiate the reciprocating downward and upward movements of the saw blade 43 in the upright direction.

As shown in FIGS. 5, 6 and 10, a speed ratio varying device includes a first pulley 81, a second pulley 82, a control unit 90, and a belt 83.

The first pulley 81 has a first fixed disc 811 which is mounted securely on the first transmitting shaft 63, and a first movable disc 812 which is splined to the first transmitting shaft 63 to be movable relative to the first fixed disc 811 along the first axis. The first fixed and movable discs 811, 812 respectively have first belt-engaging surfaces which cooperatively define therebetween a first belt receiving space.

The second pulley 82 has a second fixed disc 821 which is mounted securely on the second transmitting shaft 73, and a second movable disc 822 which is splined to the second transmitting shaft 73 to be movable relative to the second fixed disc 821 along the second axis. The second fixed and movable discs 821, 822 respectively have second belt-engaging surfaces which cooperatively define therebetween a second belt receiving space. With reference to FIG. 9, a biasing member 813 is disposed between the first movable disc 812 and the first driven wheel 65 to bias the first movable disc 812 toward the first fixed disc 811.

The belt 83 is trained on the first and second pulleys 81, 82, and is frictionally slidable on the first and second belt-engaging surfaces. The belt 83 has a first lengthwise end which cooperates with the first transmitting shaft 63 to define a first radial distance therebetween, and a second lengthwise end which is opposite to the first lengthwise end and which cooperates with the second transmitting shaft 73 to define a second radial distance therebetween.

The control unit 90 includes a bearing member 91 which is sleeved on a sleeve portion 8221 that extends from the second movable disc 822 and which has a securing race that is rotated with the second movable disc 822 and a pushed race opposite to the securing race along the second axis, a pushing member 92 which has a pushing end 921 that is slidably sleeved on the sleeve portion 8221 to urge the pushed race of the bearing member 91 with an urging force or to relieve the pushed race of the urging force, a positioning seat 93 which is secured on the side wall 23 and which is formed with a screw hole 931, an operable member 94, such as a threaded bolt, which engages threadably the screw hole 931 and which has an inner segment 941 that abuts against a coupled end 922 of the pushing member 92, and an outer segment 942 that is provided with a rotary knob 95.

As such, referring to FIGS. 4, 9 and 10, when the motor 51 is actuated to rotate the first transmitting shaft 63. The rotational force of the first transmitting shaft 63 is transmitted to rotate the second transmitting shaft 73 by means of the speed ratio varying device such that the second driven wheel 77 is rotated to drive the saw blade 43 to perform reciprocating movement.

Threaded movement of the threaded bolt 94 relative to the positioning seat 93 will displace the pushing member 92 along the second axis so as to move the second movable disc 822 between first and second positions.

Figure 11:
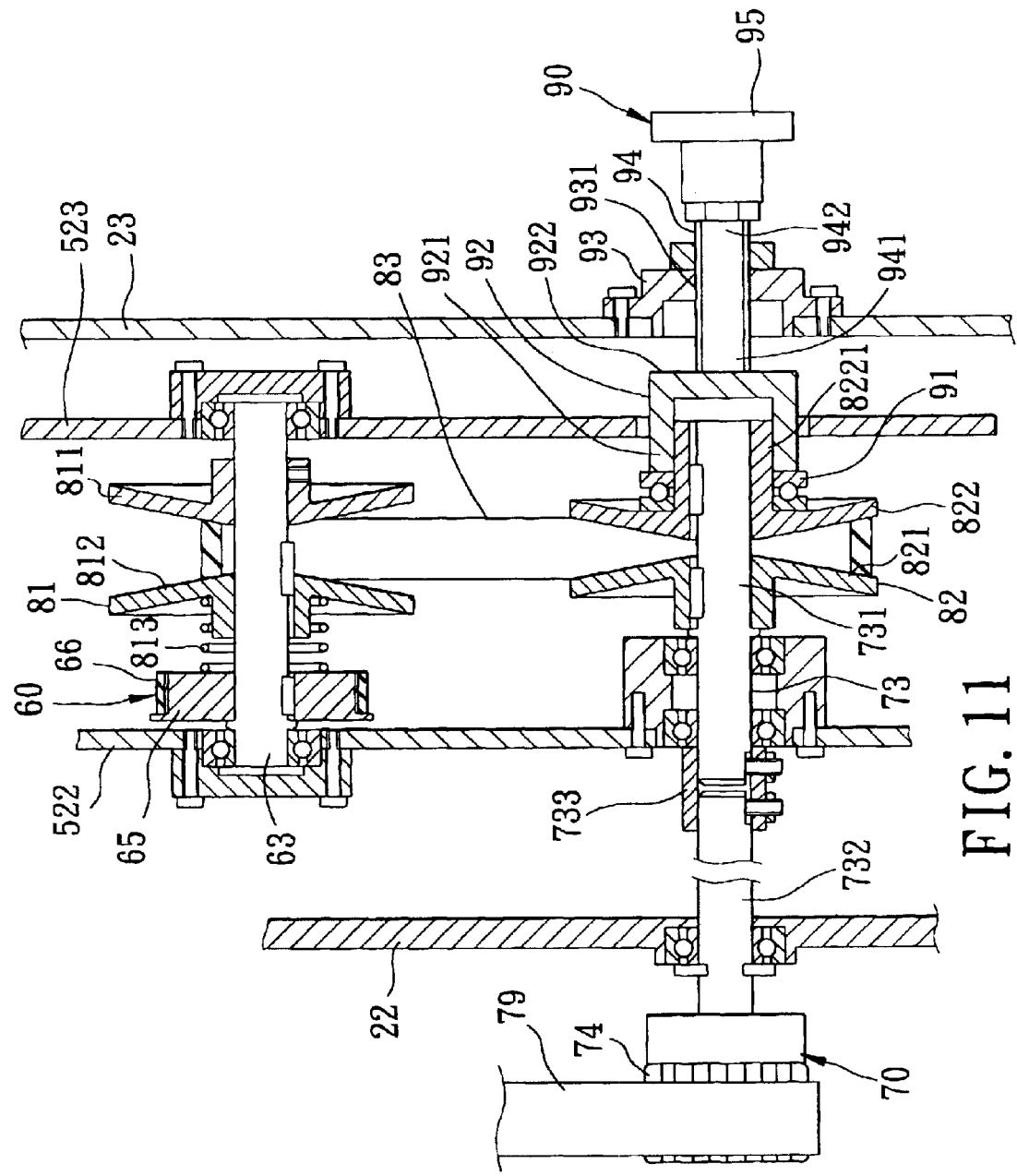
FIG. 11 is a view similar to FIG. 10 but showing the preferred embodiment in a state where the control unit is operated to press a movable disc.
Figure 12:
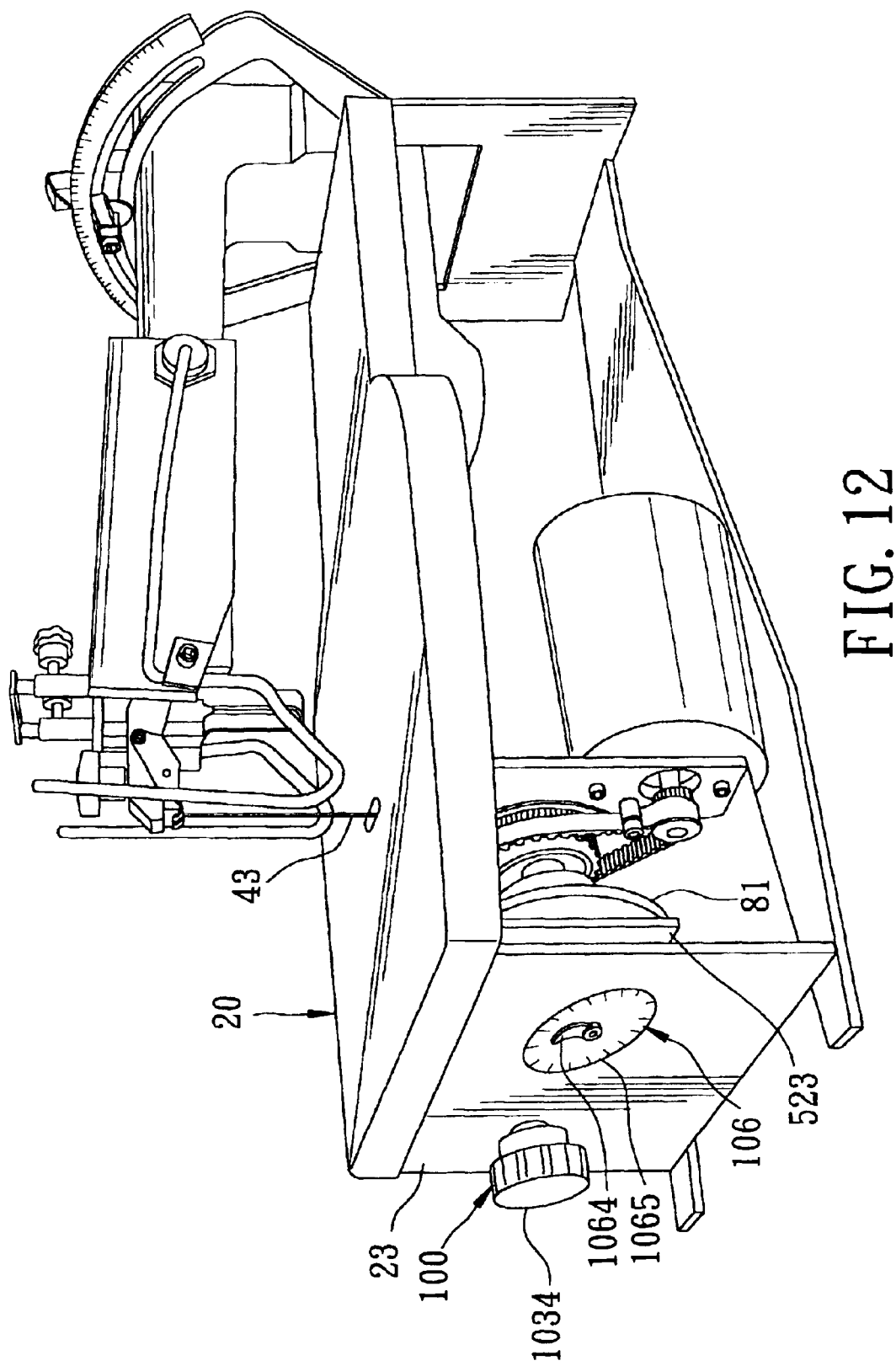
FIG. 12 is a perspective view of another preferred embodiment of the scroll sawing machine according to this invention.
Figure 13:
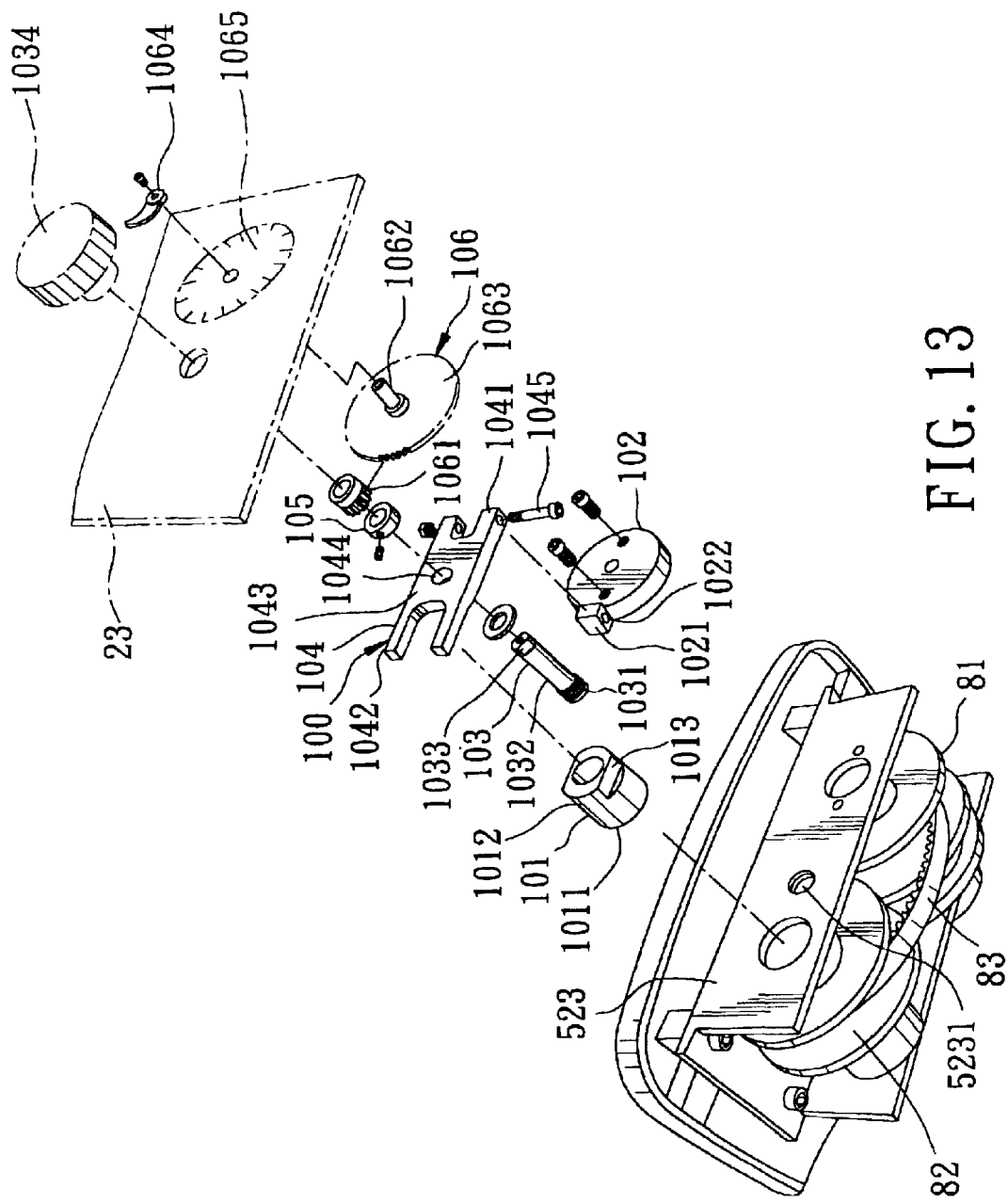
FIG. 13 is a fragmentary exploded perspective view of a speed ratio varying device of the preferred embodiment.
Figure 14:
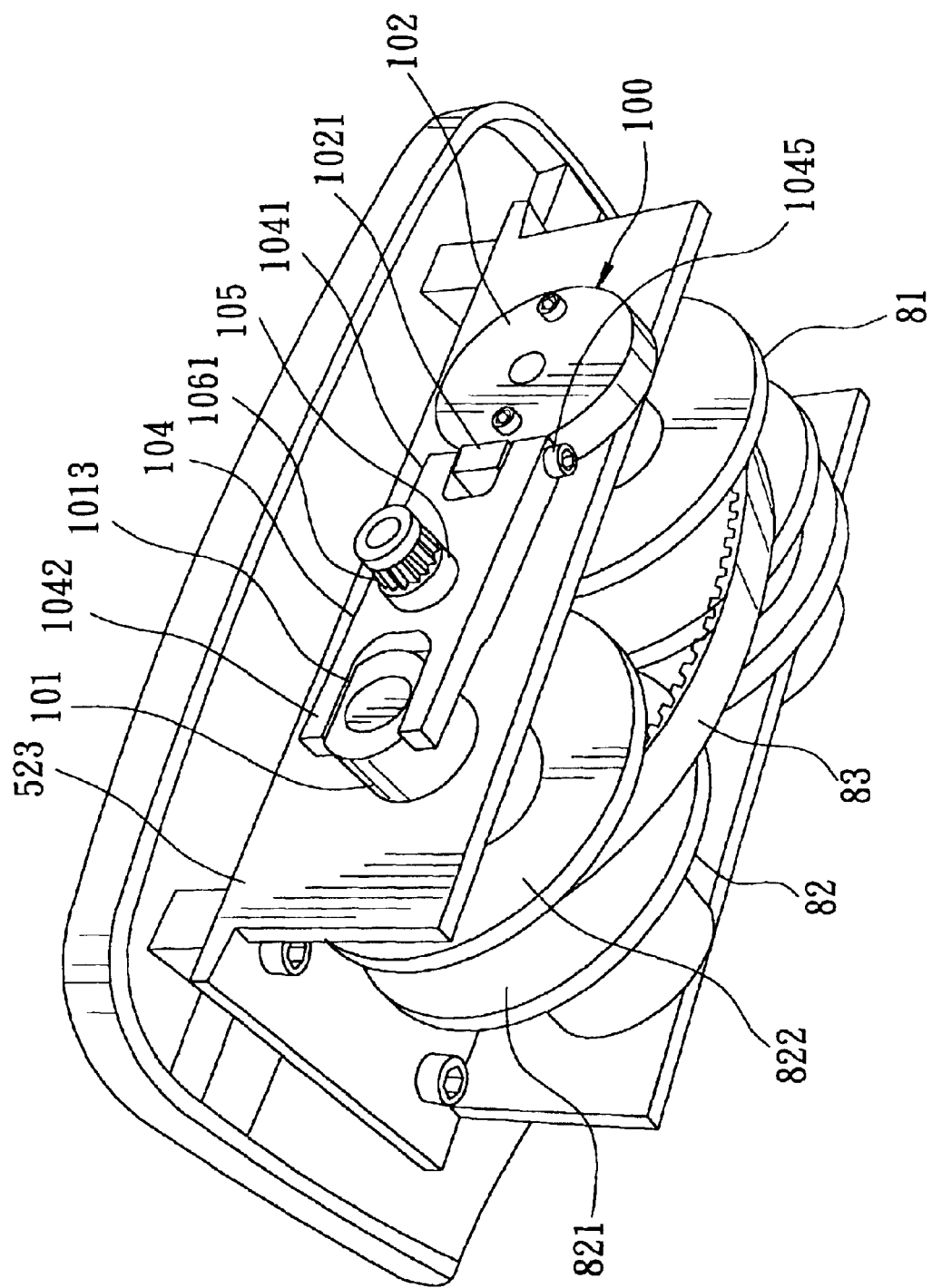
FIG. 14 is a fragmentary perspective view of the speed ratio varying device.

As shown in FIG. 11, in the first position, the second movable disc 822 is close to the second fixed disc 821 so that the second lengthwise end is remote from the second transmitting shaft 73 so as to result in a greater length of the second radial distance, and the first movable disc 812 is kept apart from the first fixed disc 811 by a tension force which is generated as a result of displacement of the first lengthwise end toward the first transmitting shaft 63 and which acts against biasing action of the biasing member 813. As such, the first and second pulleys 81, 82 operate like a small gear that drives a large gear, thereby resulting in a smaller speed ratio of the second transmitting shaft 73 to the first transmitting shaft 63.

As shown in FIG. 10, in the second position, the second movable disc 822 is remote from the second fixed disc 821 so that the second lengthwise end is near to the second transmitting shaft 73 so as to result in a smaller length of the second radial distance, and the first movable disc 812 is held close to the first fixed disc 811 by the biasing action of the biasing member 813. As such, the first and second pulleys 81, 82 operate like a large gear that drives a small gear, thereby resulting in a larger speed ratio of the second transmitting shaft 73 to the first transmitting shaft 63.

Referring to FIGS. 12 to 15, another preferred embodiment of the scroll sawing machine according to this invention is shown to include a control unit 100 which includes a bearing member 91, a pushing member 101, an operable member 103, and an actuating member 104.

The bearing member 91 is sleeved on the sleeve portion 8221 of the second movable disc 822, and has a securing race which is rotated with the second movable disc 822, and a pushed race which is opposite to the securing race along the second axis.

The pushing member 101 has an abutting end 1011 which is slidably sleeved on the sleeve portion 8221 along the second axis to urge the pushed race of the bearing member 91 with an urging force or to relieve the pushed race of the urging force so as to place the second movable disc 822 in the first or second positions, respectively, and a coupled end 1012 opposite to the abutting end 1011 along the second axis.

A positioning seat 102 is secured on the upright support plate 523, and has a pivot block 1021 which extends toward the pushing member 101 and which is formed with a pivot hole 1022.

The actuating member 104 has a fulcrum end 1041 which is pivotally mounted on the pivot block 1021 by means of a pivot pin 1045 that extends along a pivot axis transverse to the second axis and the upright direction, and a weight end 1042 which is disposed opposite to the fulcrum end 1041 and which is coupled to an abutting wall 1013 of the coupled end 1012 of the pushing member 101 such that when the weight end 1042 is turned about the pivot axis clockwise or counterclockwise, the coupled end 1012 will place the second movable disc 822 in the first position or the second position, and a middle force portion 1043 which is interposed between the fulcrum end 1041 and the weight end 1042 and which is formed with a through hole 1044.

Figure 15:
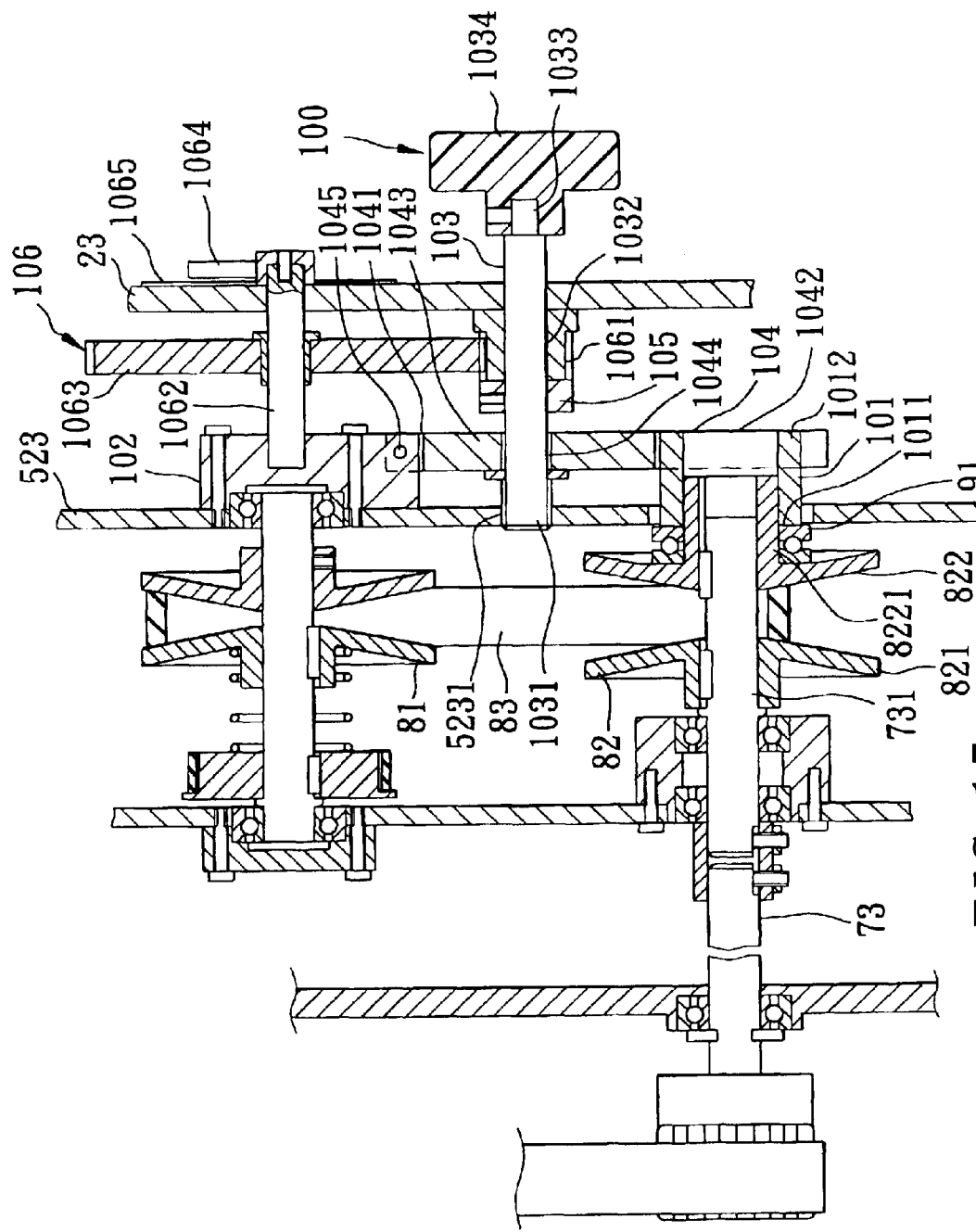
FIG. 15 is a partly sectional view of the preferred embodiment in a state where a control unit is not operated.
Figure 16:
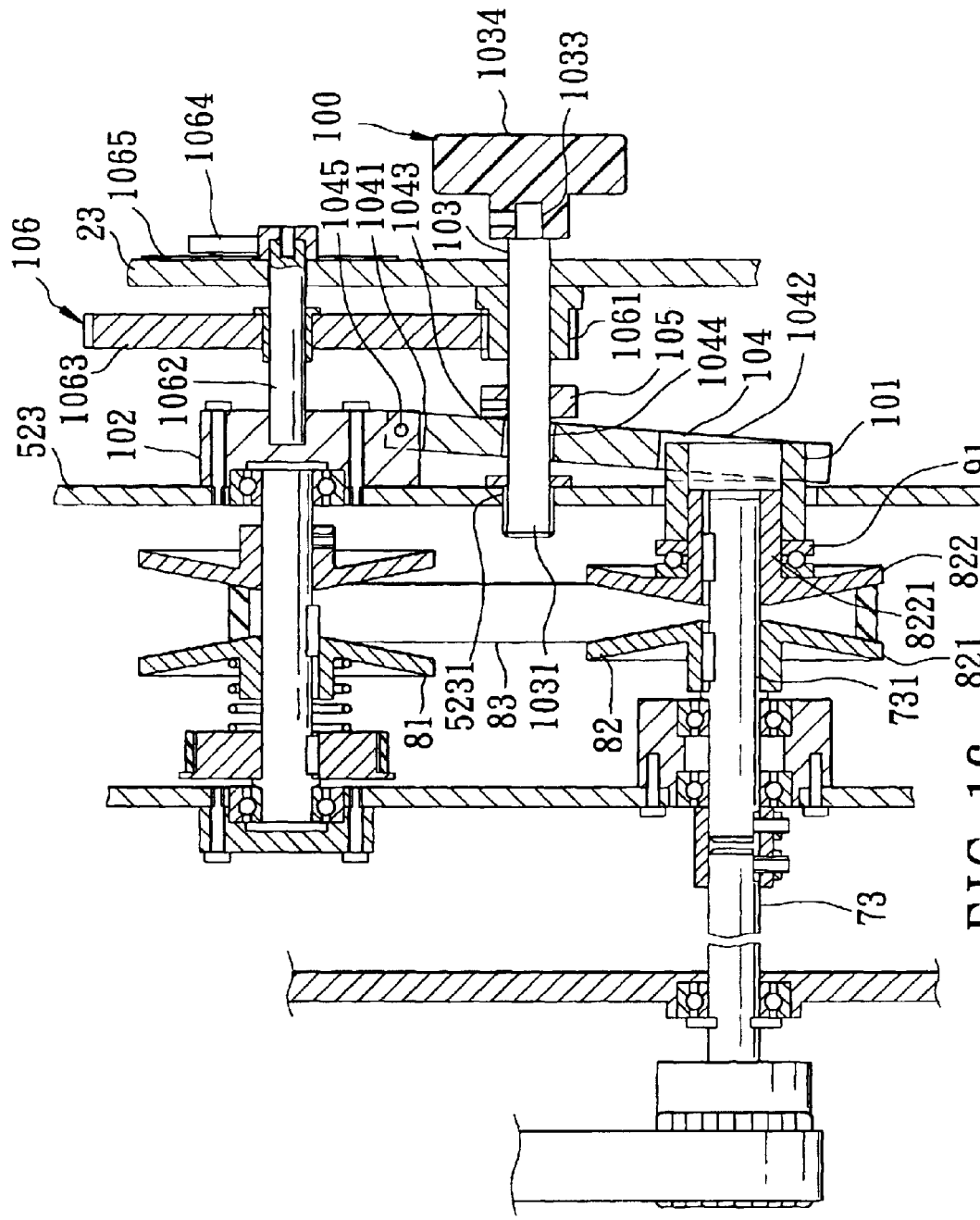
FIG. 16 is a view similar to FIG. 15 but showing the preferred embodiment in a state where the control unit is operated to press a movable disc.

The operable member 103 is a threaded bolt 103, and extends along a third axis parallel to the second axis. The threaded bolt 103 has a threaded segment 1031 which engages threadably a screw hole 5231 in the upright support plate 523, a pushing segment 1032 opposite to the threaded segment 1031 relative to the force portion 1043 of the actuating member 104, and an outwardly actuated segment 1033 which is provided with a rotary knob 1034. A pushing block 105 is secured on the pushing segment 1032. Thus, as shown in FIGS. 15 and 16, threaded movement of the threaded bolt 103 relative to the upright support plate 523 will bring the pushing block 105 to displace along the third axis so as to push against the force portion 1043 of the actuating member 104 to turn the weight end 1042 about the pivot axis, thereby placing the second movable disc 822 in the first position (see FIG. 16) or the second position (see FIG. 15).

Furthermore, a speed indicating device 106 has a pinion 1061 which is mounted to be coaxially rotated with the pushing segment 1032 of the threaded bolt 103, a rotary shaft 1062 which is mounted rotatably between the side wall 23 and the positioning seat 102, and a toothed wheel 1063 which is meshed with the pinion 1061 to rotate the rotary shaft 1062. The rotary shaft 1062 has an indicator needle 1064 mounted thereon. The indicator needle 1064 is turnable with the rotary shaft 1062 and cooperates with a dial 1065 which is attached on the side wall 23 to indicate the relative rotational speed of the second transmitting shaft 73 and the sawing speed of the saw blade 43.

With a construction as such, the operator only needs to turn the rotary knob 1034 through a predetermined angle, which can be determined with reference to the position of the indicating needle 1064 on the dial 1065 in order to vary the speed ratio of the second transmitting shaft 73 to the first transmitting shaft 63 so as to change freely the rotational speed of the second transmitting shaft 73 as well as the sawing speed of the saw blade 43.

While the present invention has been described in connection with what is considered the most practical and preferred embodiments, it is understood that this invention is not limited to the disclosed embodiments but is intended to cover various arrangements included within the spirit and scope of the broadest interpretations and equivalent arrangements.

We claim:

1. A scroll sawing machine comprising:

a machine frame;

a table disposed on said machine frame and adapted for placement of a workpiece to be sawn thereon;

a motor disposed under said table, and having an output shaft for delivering a driving force;

a saw blade extending through said table, and having upper and lower ends opposite to each other in an upright direction;

a blade-driving member including upper and lower driving portions which respectively have distal ends that are coupled respectively with said upper and lower ends of said saw blade, and proximate ends that are disposed respectively opposite to said distal ends, and a linking lever which has upper and lower connecting ends that are connected pivotally and respectively to said proximate ends such that movement of said linking lever in the upright direction results in running movement of said saw blade in the upright direction;

a first transmitting shaft disposed under said table adjacent to said output shaft, and driven by the driving force of said output shaft to be rotatable about a first axis;

a second transmitting shaft disposed under said table, and rotatable about a second axis parallel to the first axis;

a cam member coupled to said second transmitting shaft and said linking lever such that rotation of said second transmitting shaft is transmitted to said linking lever to effectuate the movement of said linking lever in the upright direction so as to initiate the movement of said saw blade in the upright direction;

a speed ratio varying device disposed to couple said first transmitting shaft to said second transmitting shaft so as to transmit the driving force of said output shaft to said second transmitting shaft, thereby driving said second transmitting shaft to rotate about the second axis, and including a first pulley having a first fixed disc which is mounted securely on said first transmitting shaft, and a first movable disc which is splined to said first transmitting shaft so as to be movable relative to said first fixed disc along the first axis, said first fixed and movable discs respectively having first belt-engaging surfaces which cooperatively define therebetween a first belt receiving space, a second pulley having a second fixed disc which is mounted securely on said second transmitting shaft, and a second movable disc which is splined to said second transmitting shaft so as to be movable relative to said second fixed disc along the second axis, said second fixed and movable discs respectively having second belt-engaging surfaces which cooperatively define therebetween a second belt receiving space, a control unit mounted on said machine frame, and having an operable member which is disposed to actuate said second movable disc to move along the second axis so as to be close to or remote from said second fixed disc, a biasing member disposed to bias said first movable disc toward said first fixed disc, and a belt trained on said first and second pulleys, and frictionally slidable on said first and second belt-engaging surfaces, said belt having a first lengthwise end which cooperates with said first transmitting shaft to define a first radial distance therebetween, and a second lengthwise end which is opposite to said first lengthwise end and which cooperates with said second transmitting shaft to define a second radial distance therebetween such that, when said second movable disc is actuated by said operable member, said second movable disc is movable along the second axis between a first position, where said second movable disc is close to said second fixed disc so that said second lengthwise end is remote from said second transmitting shaft so as to result in a greater length of the second radial distance, and where said first movable disc is kept apart from said first fixed disc by a tension force which is generated as a result of displacement of said first lengthwise end toward said first transmitting shaft and which acts against biasing action of said biasing member, thereby resulting in a smaller speed ratio of said second transmitting shaft to said first transmitting shaft, and a second position, where said second movable disc is remote from said second fixed disc so that said second lengthwise end is near to said second transmitting shaft so as to result in a smaller length of the second radial distance, and where said first movable disc is held close to said first fixed disc by the biasing action of said biasing member, thereby resulting in a greater speed ratio of said second transmitting shaft to said first transmitting shaft, wherein said control unit further includes a bearing member having a securing race which is rotated with said second movable disc, and a pushed race which is opposite to said securing race along the second axis, a pushing member disposed to be movable along the second axis, and having a pushing end to urge said pushed race with an urging force, or to relieve said pushed race of the urging force so as to place said second movable disc in the first or second positions, respectively, and a coupled end opposite to said pushing end along the second axis, and an actuating member having a fulcrum end pivotally mounted on said machine frame about a pivot axis transverse to the second axis and the upright direction, a weight end opposite to said fulcrum end and coupled to said coupled end such that when said weight end is turned about the pivot axis clockwise or counterclockwise, said coupled end will place said second movable disc in the first position or the second position, and a middle force portion interposed between said fulcrum end and said weight end, said operable member being a threaded bolt which extends alone a third axis parallel to the second axis, said threaded bolt having a threaded segment which engages threadedly said machine frame, and a pushing segment opposite to said threaded segment relative to said force portion such that threaded movement of said threaded bolt relative to said machine frame will bring said pushing segment to displace along the third axis so as to push against said force portion to turn said weight end about the pivot axis, thereby placing said second movable disc in the first position or the second position.

2. The scroll sawing machine of claim 1, further comprising a pinion mounted to be coaxially rotated with said threaded bolt, and a toothed wheel mounted on said machine frame, and meshed with said pinion, and a rotary shaft rotated with said toothed wheel, and having an indicator needle mounted thereon for indicating a speed of said second transmitting shaft.

* * * * *